US007537819B2

(12) United States Patent
Hendricks

(10) Patent No.: US 7,537,819 B2
(45) Date of Patent: May 26, 2009

(54) ONE-PIECE EXPANDING PLASTIC SHIM

(75) Inventor: Robert Hendricks, Youngstown, OH (US)

(73) Assignee: Dinesol Plastics, Inc., Niles, OH (US)

( * ) Notice: Subject to any disclaimer, the term of this patent is extended or adjusted under 35 U.S.C. 154(b) by 612 days.

(21) Appl. No.: 11/210,359

(22) Filed: Aug. 24, 2005

(65) Prior Publication Data

US 2006/0042176 A1 Mar. 2, 2006

Related U.S. Application Data

(60) Provisional application No. 60/604,237, filed on Aug. 25, 2004.

(51) Int. Cl.
*B32B 3/24* (2006.01)

(52) U.S. Cl. ........................ 428/131; 52/126.1; 52/217; 16/247

(58) Field of Classification Search ................. 428/131; 52/126.1, 217; 16/247
See application file for complete search history.

(56) References Cited

U.S. PATENT DOCUMENTS

| | | | | |
|---|---|---|---|---|
| 5,853,838 | A | 12/1998 | Siems | |
| 5,953,862 | A | 9/1999 | Earhart | |
| 6,155,004 | A | 12/2000 | Earhart | |
| 6,216,402 | B1 * | 4/2001 | Van de Laar | 52/217 |

* cited by examiner

*Primary Examiner*—William P Watkins, III
(74) *Attorney, Agent, or Firm*—Robert G. Lev, Esq.

(57) ABSTRACT

A single piece, plastic shim simplifies the process of shimming a fixture (such as a door) within a frame. The operation of the shim requires only that one piece of the shim be pulled so that the shim folds in on itself, filling the space between the frame and the fixture. Only a small portion of the shim extends beyond the frame, and needs to be cut. This arrangement avoids stress to the shim and the frame.

8 Claims, 2 Drawing Sheets

1

ONE-PIECE EXPANDING PLASTIC SHIM

PRIORITY INFORMATION

This application has priority based upon U.S. Provisional Patent Application No. 60/604,237 filed Aug. 25, 2004, and makes reference herein to its entirety.

FIELD OF THE INVENTION

The present invention generally relates to shimming devices for mounting doors, windows and the like, within mounting apertures made for this purpose. In particular, the present invention is directed to a plastic adjustable shim.

BACKGROUND OF THE INVENTION

In the arts of assembly and construction shims constitute a well-known expedient for adjusting the placement and orientation of doors, windows and the like. However, the use of shims is not confined to the mounting of doors and windows. Rather, any fixture to be installed and oriented (leveled) within an aperture in a structure benefits from the use of shims.

A very common use of shims is in the building industry, where shims are conventionally constituted by wooden wedges. These are fit into spaces as needed to properly square the fixture that is being mounted within a structure frame. A shim (or plurality of shims) is normally forced (often using impact) into a space between the structure frame and the fixture until the correct leveling and orientation is achieved. Afterwards, those parts of the shim that stick out beyond the frame in which the fixture is mounted are broken off.

Traditionally, shims have been made of wood. Very often, they are simply scraps of wood that are collected at the convenience of the builders, and used wherever they would fit. Unfortunately, the collection of appropriate scraps has resulted in lost time, as has the on-site manufacturer shims from scrap pieces of wood. This is often awkward, especially if those mounting the structure within the frame are not particularly skilled.

Consequently, pre-manufactured wooden shims are often purchased as a matter of convenience to save the valuable time of the workers who are mounting the fixture. One well-known type of wooden shim is mass-produced to a general size of approximately nine inches long by approximately two inches wide. These are generally made of varying thicknesses from ¼ inch up to ½ inch thick. Normally the cross section is configured as a wedge since this is the best shape for forcing the shim into a space until the proper squaring of the structure is achieved. After the fixture is properly positioned in the frame through the use of shims, any parts of the shim extended beyond the frame are broken off.

There are a number of drawbacks with traditional wooden shims. Either they have to be purchased, or they have to be salvaged from scraps on a job site. One difficulty with wood is that it can be splintered relatively easily, especially if subject to substantial duress. This is usually present on a job site where the wooden shim has often been splintered from a larger piece of wood, forced into a space (usually through impact), and then splintered again when mounting screws or nails are driven through it. All of this disruption might easily degrade the wooden shim until it is no longer fit for its original purpose. The wood itself is also vulnerable to the environment since it is relatively porous. As a result, the wood tends to compress or expand if force is applied to it. This is especially true if the wood is subjected to moisture, even just that in the surrounding air. Wood does decay or degrade over time, especially when subjected to a wide range of environmental situations.

Alternatives to wood have also proven to be somewhat expensive due to material and fabrication costs. However, there have been attempts to use plastic wedges as shims. Such devices are discussed in U.S. Pat. Nos. 6,155,004; 5,953,862; and, 5,853,838. All these patents are incorporated by reference as demonstrating the advantages of using plastic as a shimming material.

Plastic shims are easily configured to accommodate fracture lines and screw holes, thereby overcoming one of the chief disadvantages of wooden shims. However, in size and shape, the plastic shims of the aforementioned patents are the same as wooden shims, an elongated wedge. Consequently, it is usually necessary to use multiple plastic shims in the same manner of using wooden shims. The use of multiple plastic shims also mean that screw holes may no longer align, and that fracture lines may not be as convenient as they are for a single shim. Likewise, multiple shims means that a mass of plastic is now compressed to fill the space. This may provide some difficulty with the use of nails or screws that must be driven through the mass of plastic.

The necessity of having a large number of shims means that a great deal more construction debris will be added to any job site. Further, the standard on-site disposal of debris, burning, may not always be suitable for plastic debris.

Consequently, a more convenient and less wasteful technique for shimming would be highly desirable. The new technique should be simple to use, even for the unskilled, and require as few pieces as possible. The new system would also admit to creating reduced construction waste or debris.

SUMMARY OF THE INVENTION

Accordingly, it is a first object of the present invention to overcome the deficiencies of conventional shimming systems and techniques.

It is another object of the present invention to provide a comprehensive shimming arrangement that can be operated very easily.

It is a further object of the present invention to provide a shim which can be effectively installed without necessity of impact on the shim, frame or fixture.

It is an additional object of the present invention to provide a shimming system which is convenient to use and requires virtually no skill.

It is still another object of the present invention to provide a shimming system that creates less debris than is done in conventional shimming arrangements.

These and other goals and objects of the present invention are accomplished by a one-piece, plastic shim that has an arrangement for creating tension so as to increase the thickness of the shim.

Another manifestation of the present invention is found in a method of mounting a single shim in place and then increasing its thickness to a desired value.

DETAILED DESCRIPTION OF THE PREFERRED EMBODIMENTS

Figure 1:
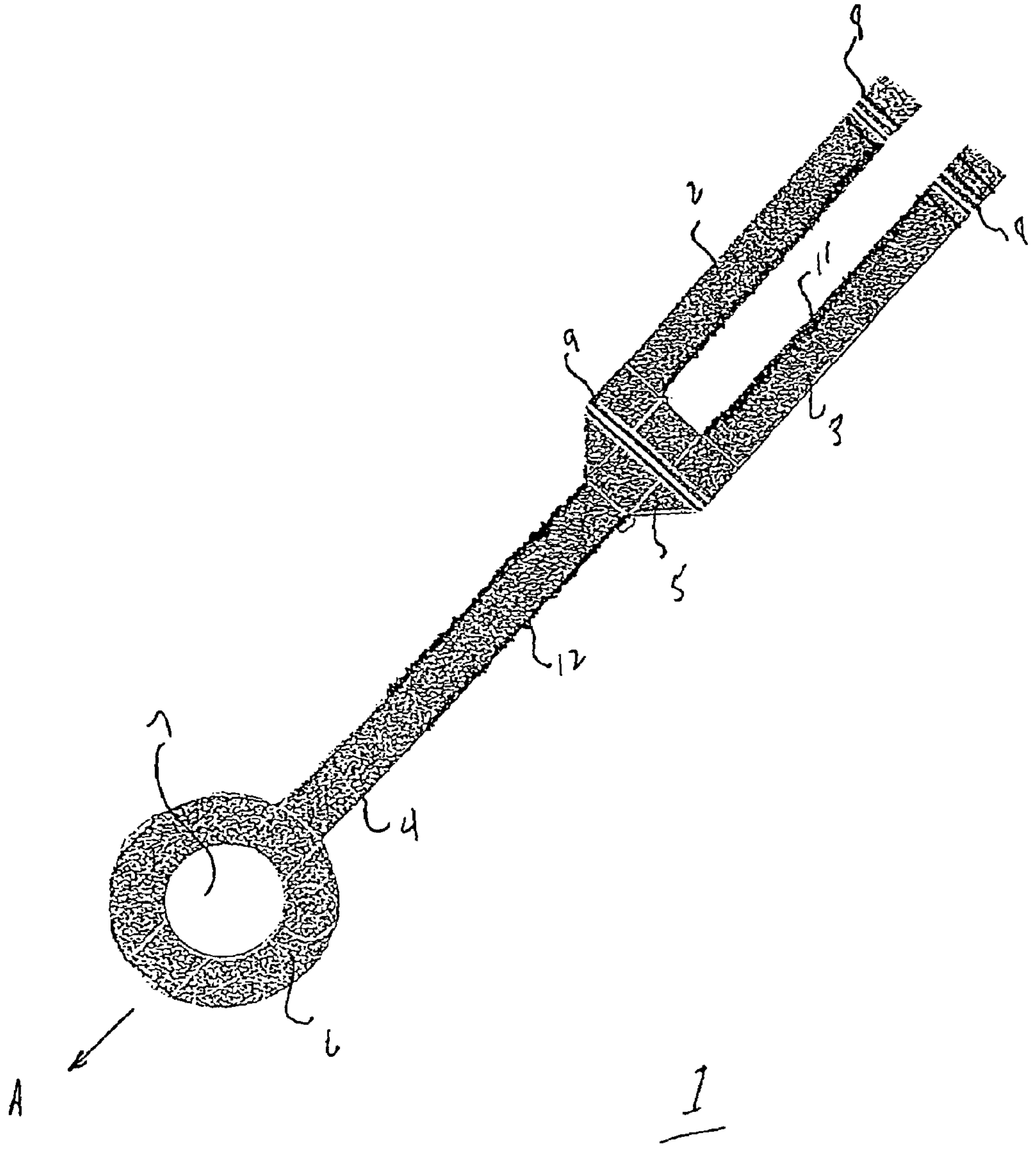
FIG. 1 is a top view of a first embodiment of the present invention.
Figure 2:
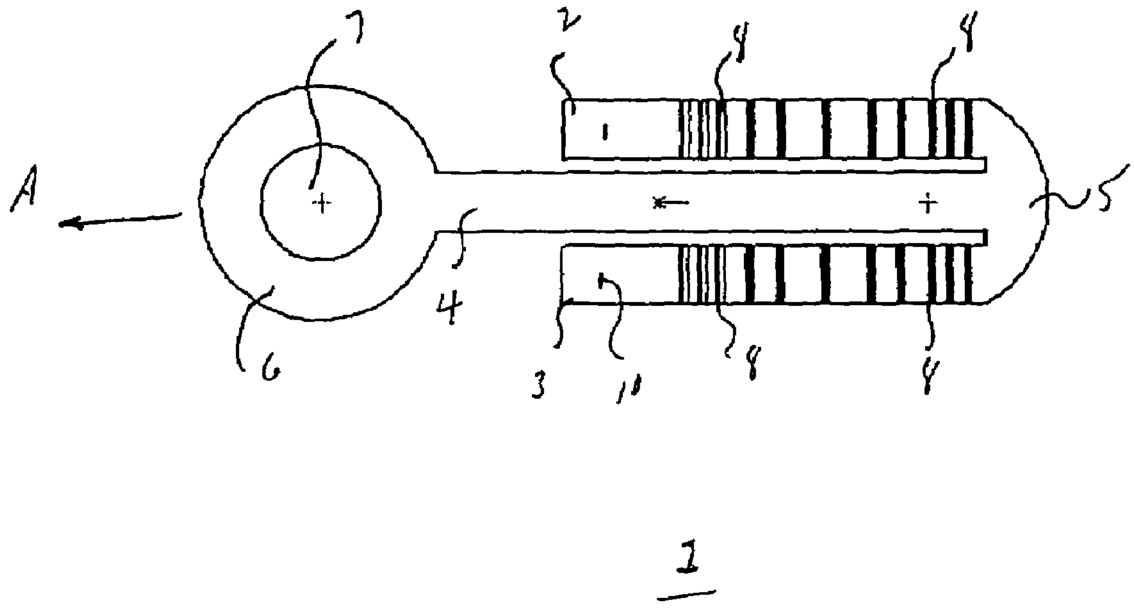
FIG. 2 is a top view of a second embodiment of the present invention.

FIGS. 1 and 2 depict two different embodiments of the present invention. The shim system of the present invention is constituted by a single piece of plastic 1 arranged to be attached in place and then adjusted until the desired thickness is achieved. The thickness is maintained through a self-locking arrangement, which operates by connecting shims to a structure frame.

The shim 1 as depicted in FIG. 2 has a main stem 4 and two legs 2, 3, all connected by a connecting portion 5. At the opposite end of stem 4 is a handle 6. In this particular embodiment a finger hole 7 has been formed in the handle to accommodate a used finger. It should be noted that any kind of gripping arrangement can be used as part of handle 6, as long as it facilitates the necessary operation of shim 1.

In operation, the installer places shim 1 into a space between a structure frame (not shown) and a fixture frame (not shown). This is usually very easy since the shim is made of a thin plastic, preferably between 0.060 inches and 0.080 inches. Because it is so thin, the shim must be held in place until it is adjusted to the proper thickness. This is facilitated by stapling or otherwise fixing the distal ends of arms 2, 3 to the frame of the structure into which the fixture is being mounted. This can be facilitated by perforations 10 to accommodate any of screws, staples, tacks or nails. Any convenient way of fastening the two distal ends of legs 2, 3 falls within the concept of the present invention.

Once shim 1 has been positioned between the fixture (not shown) and structure frame (not shown), the installer pulls handle 6 extending longitudinal force in direction A. Because a series of parallel grooves 8 have been cut in both legs 2, 3, the two legs begin to fold upon themselves along their lengths as the grooves permit folding and locking of adjacent portions of the two legs so that each leg expands, increasing its thickness multiple times. As legs 2, 3 fold in upon themselves with continued force exerted in direction A, shim 1 effectively becomes thicker, expanding and filling the space between the frame and the side of the fixture being mounted. The shim is self-regulating in that once the thickness between the structure frame and the fixture to be mounted has been solidly filled by the increasing thickness of the multiple folding legs 2, 3, the installer will have difficulty pulling handle 6 any further in direction A. This means that the space between the structure and the fixture has been filled by the expansion of the folding legs 2, 3.

While the effective thickness at the two legs 2, 3 increases, the thickness of stem 4 remains the same. Preferably, the shim 1 can be attached in place by nails, screws, tacks or staples driven through the frame of the fixture, through the stem 4 and into the frame of the supporting structure. This will keep the thickness of the two folding legs from being compromised.

The thickness of the expanded folded legs 2, 3 will maintain itself naturally because grooves 8 cut along the length of both legs form a series of tooth-like structures. These structures tend to lock with each other as the legs are folded upon themselves, thereby effecting an increasing thickness to the legs.

After the shim 1 has been installed, the handle 6 is easily removed by a utility knife or a pair of cutters. Any parts of the shim extended beyond the frame of the structure and the fixture can be cut off with any conventional means available. This is particularly easy since the one piece plastic is relatively thin and easily fractured. Trimming can also be facilitated through the use of fracture lines (not shown) on stem 4 and at the distil ends of legs 2, 3.

Because only a small portion of shim 1 must be cut away, there is far less debris introduced to the job site. The majority of the shim is folded into the space between structure frame and the side of the fixture.

Also, the installation of shim 1 can be done without resort to impact tools such as hammers, which are usually necessary to drive home conventional plastic and wooden shims. As a result, a great deal of duress to the shim, the structure frame and the fixture, is avoided. Because only a simple tacking or stapling operation is necessary to originally position the shim 1, a great deal of time is saved as well. Even entirely unskilled workers can easily and effectively utilize the inventive shim.

FIG. 1 is a second embodiment of the present invention. It operates in the same manner as the embodiment of FIG. 2. However, legs 2, 3 are originally formed as extensions of stem 4 (connected by portions). This is done for ease of manufacture. A folding groove 9 is formed in connecting portion 5 so that legs 2, 3 can be folded back parallel to stem 4 as depicted in FIG. 2. Afterwards, the operation of shim 1 is the same as that described with respect in FIG. 2.

It should be understood that additional teeth 12 can be formed on legs 2, 3 to interact with teeth 11 on stem 4. This can help the legs 2, 3 to grip onto stem 4 as the legs fold over on themselves to provide the thickness needed in the shim space. However, teeth 11, 12 are not necessary to the present invention, and merely provide one variation thereof. The folding action caused by the parallel grooves 8 is critical to the present invention, and the use of auxiliary teeth 10, 11 is an option that can add to the effectiveness of the overall device.

While a number of embodiments of the present invention have been described by way of example, the present invention is not limited thereto. Rather, the present invention encompasses all variations, adaptations, modifications, permutations, derivations, and embodiments that would occur to one skilled in this art having possession of the present invention. Accordingly, the present invention is limited only by the following claims.

I claim:

1. A one-piece plastic shim arranged for mounting between a fixture and its frame, said shim comprising:

(a) a pair of legs joined together at one end thereof by a connecting piece, each said leg divided into segments by hinged structures across a width of each said leg;

(b) a handle piece arranged between said two legs and attached to said connecting piece;

(c) wherein longitudinal movement of said handle results in said segments folding upon each other to increase thickness of said plastic shim.

2. The shim of claim 1, wherein said handle comprises a finger hole.

3. A method of shimming a fixture having a first surface within a frame, having a second surface, said method comprising the steps of:

(a) placing a shim having two legs on said second surface to, (b) pulling a portion of said shim so that said two legs fold in on themselves, effecting a thickening structure and further separation of said surfaces.

4. The method of claim 3, further comprising the step of:

(c) trimming said shim to conform with said fixture and said frame.

5. The shim of claim 1, wherein said hinged structures function as locking mechanisms with each other.

6. The shim of claim 1, further comprising perforations at distal portions of said legs.

7. The shim of claim 1, wherein said shim has an original thickness of between 0.06" and 0.08".

8. The shim of claim 1, further comprising locking teeth arranged along edges of said handle and said legs.

* * * * *